United States Patent
Wang et al.

(10) Patent No.: US 12,445,593 B2
(45) Date of Patent: Oct. 14, 2025

(54) METHOD AND APPARATUS FOR ADJUSTING VIEWING ANGLE OF DISPLAY SCREEN, AND STORAGE MEDIUM AND ELECTRONIC DEVICE

(71) Applicant: SHENZHEN TCL DIGITAL TECHNOLOGY LTD., Shenzhen (CN)

(72) Inventors: Jie Wang, Shenzhen (CN); Yixin Chen, Shenzhen (CN)

(73) Assignee: SHENZHEN TCL DIGITAL TECHNOLOGY LTD., Guangdong (CN)

(*) Notice: Subject to any disclaimer, the term of this patent is extended or adjusted under 35 U.S.C. 154(b) by 29 days.

(21) Appl. No.: 18/715,091

(22) PCT Filed: Nov. 2, 2022

(86) PCT No.: PCT/CN2022/129365
§ 371 (c)(1),
(2) Date: May 30, 2024

(87) PCT Pub. No.: WO2023/103659
PCT Pub. Date: Jun. 15, 2023

(65) Prior Publication Data
US 2025/0030830 A1    Jan. 23, 2025

(30) Foreign Application Priority Data
Dec. 6, 2021    (CN) .......................... 202111481136.5

(51) Int. Cl.
*H04N 13/383*    (2018.01)
*H04N 13/32*    (2018.01)
*H04N 13/398*    (2018.01)

(52) U.S. Cl.
CPC .......... *H04N 13/383* (2018.05); *H04N 13/32* (2018.05); *H04N 13/398* (2018.05)

(58) Field of Classification Search
CPC .... H04N 13/383; H04N 13/32; H04N 13/398; G06F 3/011; G06F 3/012; G06F 3/147;
(Continued)

(56) References Cited

U.S. PATENT DOCUMENTS

| | | | | |
|---|---|---|---|---|
| 2010/0283839 | A1* | 11/2010 | Liu | H04N 13/368 348/E13.001 |
| 2013/0044290 | A1* | 2/2013 | Kawamura | A61B 3/024 351/239 |

(Continued)

FOREIGN PATENT DOCUMENTS

| | | |
|---|---|---|
| CN | 109300434 A | 2/2019 |
| CN | 109410890 A | 3/2019 |

OTHER PUBLICATIONS

International Search Report in International application No. PCT/CN2022/129365, mailed on Jan. 18, 2023.
(Continued)

*Primary Examiner* — Tung T Vo
(74) *Attorney, Agent, or Firm* — PV IP PC; Wei Te Chung (57) ABSTRACT

A method and an apparatus for adjusting a viewing angle of a display screen, and a storage medium and an electronic device are disclosed. The method includes: determining a target user, and positioning a first position of the target user, according to the first position, determining a line-of-sight angle of the target user for each display area on a display screen, determining an adjustment parameter of each line-of-sight angle, and according to the adjustment parameter, adjusting, in the display area corresponding to each line-of-sight angle, image pixels of an image to be displayed.

17 Claims, 5 Drawing Sheets

(58) Field of Classification Search
CPC .... G06F 3/04845; G06F 3/013; G06F 3/1407; G09G 2354/00; G09G 5/10; G06V 40/19; G06T 7/70
USPC .......................................................... 348/51
See application file for complete search history.

(56) References Cited

U.S. PATENT DOCUMENTS

| | | | | |
|---|---|---|---|---|
| 2014/0118685 | A1* | 5/2014 | Kawamura | A61B 3/024 |
| | | | | 351/239 |
| 2017/0278476 | A1* | 9/2017 | Yu | G06F 3/013 |
| 2017/0324944 | A1* | 11/2017 | Nakajima | H04N 13/363 |
| 2019/0220091 | A1* | 7/2019 | Yu | G06F 1/1601 |
| 2020/0013376 | A1* | 1/2020 | Guan | G06F 3/013 |
| 2021/0225305 | A1* | 7/2021 | Niioka | G06F 3/013 |
| 2023/0075654 | A1* | 3/2023 | Wang | G09G 3/20 |
| 2023/0156171 | A1* | 5/2023 | Krener-Iversen | H04N 13/368 |
| | | | | 348/51 |
| 2024/0013752 | A1* | 1/2024 | Hua | G09G 5/391 |

OTHER PUBLICATIONS

Written Opinion of the International Search Authority in International application No. PCT/CN2022/129365, mailed on Jan. 18, 2023.

* cited by examiner

METHOD AND APPARATUS FOR ADJUSTING VIEWING ANGLE OF DISPLAY SCREEN, AND STORAGE MEDIUM AND ELECTRONIC DEVICE

CROSS REFERENCE TO RELATED APPLICATIONS

This application is a US national phase application based upon an International Application No. PCT/CN2022/129365, filed on Nov. 2, 2022, which claims priority to Chinese Patent Applications No. 202111481136.5, filed on Dec. 6, 2021 and entitled "METHOD AND APPARATUS FOR ADJUSTING VIEWING ANGLE OF DISPLAY SCREEN, AND STORAGE MEDIUM AND ELECTRONIC DEVICE". The entire disclosures of the above application are incorporated herein by reference.

TECHNICAL FIELD

The present application relates to the technical field of display screens, and in particular, to a method and an apparatus for adjusting a viewing angle of a display screen, and a storage medium and an electronic device.

BACKGROUND TECHNOLOGY

Currently, display screens are widely used in various electronic devices, and their ability to display images also tends to have high resolution, high color reproduction, and high display speed.

SUMMARY OF INVENTION

Technical Problem

However, in terms of a display performance of a display screen, an actual viewing performance of a user has not been taken into account. As a result, when the user views an image displayed on the display screen, a defect of poor viewing performance has not been improved. The specific performance is as follows:

When the user views the image displayed on the display screen at different viewing angles, due to different performances of light reflection or refraction in different display areas of the display screen, some of the display areas seen by the user may become lighter or whiter. This has a defect of poor local color rendering performance, resulting in poor user viewing performance, thereby reducing a user viewing experience.

Problem Solutions

Technical Solutions

In a first aspect, embodiments of the present application provide a method for adjusting a viewing angle of a display screen, comprising: determining a target user, and positioning a first position of the target user; determining a line-of-sight angle of the target user for each display area on a display screen according to the first position; determining an adjustment parameter of each line-of-sight angle; and adjusting image pixels of an image to be displayed in the display area corresponding to each line-of-sight angle according to the adjustment parameter.

In a second aspect, embodiments of the present application further provide an apparatus for adjusting a viewing angle of a display screen, comprising: a target user detector configured to determine a target user and position a first position of the target user; an angle calculator configured to determine a line-of-sight angle of the target user for each display area on a display screen according to the first position; a parameter determiner configured to determine an adjustment parameter of each line-of-sight angle; and a pixel adjuster configured to adjust image pixels of an image to be displayed in the display area corresponding to each line-of-sight angle according to the adjustment parameter.

In a third aspect, embodiments of the present application further provide a computer-readable storage medium comprising a computer program stored thereon, wherein when the computer program is run on a computer, the computer is caused to perform the method for adjusting the viewing angle of the display screen as provided in any embodiment of the present application.

In a fourth aspect, embodiments of the present application further provide an electronic device comprising a processor and a memory, wherein the memory stores a computer program, and the processor is configured to perform the method for adjusting the viewing angle of the display screen as provided in any embodiment of the present application.

Beneficial Effects of Invention

Beneficial Effects

Technical solutions provided by embodiments of this application, by positioning the first position of the target user and obtaining the line-of-sight angle of the target user for each display area on the display screen based on the first position, a viewing performance of the target user for each display area is determined based on the line-of-sight angle. Then, based on the line-of-sight angle of each display area, the adjustment parameter for each display area is obtained. Each adjustment parameter is used to adjust the image pixels of the image to be displayed in the corresponding display area, so that when the image to be displayed is displayed in each display area, a display performance of the image pixels adjusted by the adjustment parameter is enhanced to varying degrees according to the viewing angle. In this way, the viewing performance of the target user for each display area is consistent, which avoids a defect in the prior art that a viewing performance of the user for some display areas is poor, thereby improving the viewing performance of the user. Furthermore, a display performance of each display area may also be dynamically adjusted according to the position of the target user, so that the viewing angle of each display area may be adjusted to suit the position of the target user. This meets a viewing need of the target user at different positions, thereby improving an overall display performance of the display screen.

BRIEF DESCRIPTION OF THE DRAWINGS

Description of Drawings

In order to explain technical solutions in embodiments of the present application more clearly, drawings needed to be used in the description of the embodiments will be briefly introduced below. Obviously, the drawings in the following description are only some embodiments of the present application. For those skilled in the art, other drawings may also be obtained based on these drawings without exerting creative efforts.

DETAILED DESCRIPTION OF THE PREFERRED EMBODIMENTS

The technical solutions in the embodiments of the present application will be clearly and completely described below with reference to the accompanying drawings in the embodiments of the present application. Obviously, the described embodiments are only some of the embodiments of the present application, but not all of the embodiments. Based on the embodiments in this application, all other embodiments obtained by those skilled in the art without creative efforts fall within the scope of protection of this application.

Reference herein to "an embodiment" means that a particular feature, structure or characteristic described in connection with the embodiment may be included in at least one embodiment of the present application. The appearances of this phrase in various places in the specification are not necessarily all referring to the same embodiment, nor are separate or alternative embodiments mutually exclusive of other embodiments. Those skilled in the art understand, both explicitly and implicitly, that the embodiments described herein may be combined with other embodiments.

Embodiments of the present application provide a method for adjusting a viewing angle of a display screen. The execution subject of the method for adjusting the viewing angle of the display screen may be an apparatus for adjusting the viewing angle of the display screen provided in the embodiment of the present application, or an electronic device integrating the apparatus for adjusting the viewing angle of the display screen. The apparatus for adjusting the viewing angle of the display screen may be implemented in hardware or software. The electronic device may be a television, a movie machine, a conference machine, a projector, a tablet, a computer, and other equipment with display.

Figure 1:
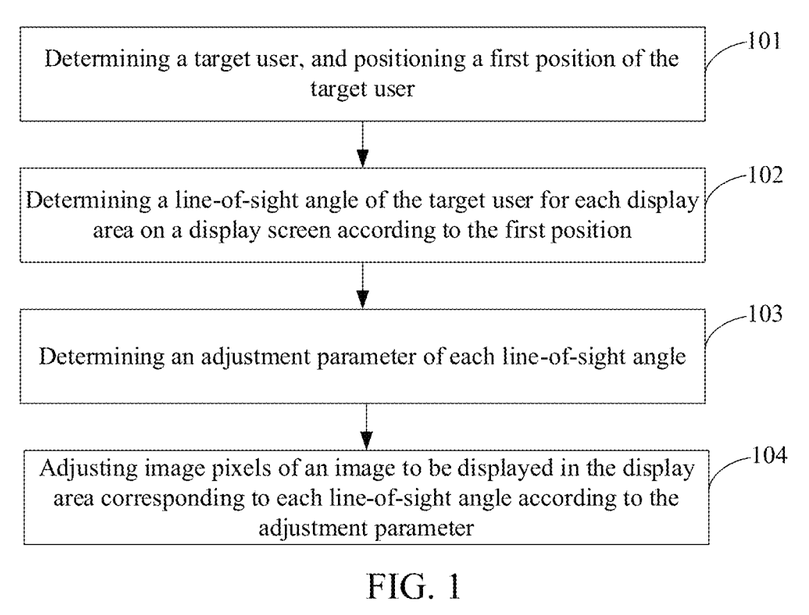
FIG. 1 is a first schematic flowchart of a method for adjusting a viewing angle of a display screen according to an embodiment of the present application.

Referring to FIG. 1, which is a first schematic flowchart of a method for adjusting a viewing angle of a display screen according to an embodiment of the present application. The specific process of the method for adjusting the viewing angle of the display screen according to the embodiment of the present application may be as follows:

101: Determining a target user, and positioning a first position of the target user.

In this embodiment, the number of users viewing the display screen is variable in different scenarios. Therefore, it is necessary to determine the target user, and obtain a line-of-sight angle of each display area on the display screen of the target user based on the first position of the target user. The adjustment parameter is determined according to the line-of-sight angle to adjust an image to be displayed in the display area.

There are many ways to determine the target user. For example, when it is determined that there is only one user, that user is regarded as the target user. When it is determined that there are multiple users, one of them is selected as the target user, or multiple users may be selected as the target user. When multiple target users are selected, a central position may be determined based on the positions of the multiple target users, and the central position may be regarded as a first position.

The method of selecting target users includes any one of the following first method or the second method, or a combination of at least one of the first method and the second method. For example, the first method is to select based on distance. It may select the user closest to the display screen as the target user, the user farthest from the display screen as the target user, the user with the farthest location as the target user, etc. The second method is other types. It may select the user who is within the display range of the center of the display screen as the target user, select the user who first enters the display range of the display screen as the target user, select the user who watches the display screen for a long time as the target user, etc. Because there are many optional methods, this application does not list them one by one here, as long as the target user may be selected from multiple users.

After determining the target user, the position of the target user may be dynamically tracked. When positioning the position of the target user, the following methods may be used:

For example, a camera may be used to capture an image of the target user, and by analysing the captured image, a viewing position of the target user in the current state, that is, the first position, may be obtained. It should be noted that one camera, a binocular camera, or more cameras may be used for positioning, so that the first position of the target user may be positioned more accurately and quickly.

For another example, a microphone may also be used for sound field positioning to obtain the first position of the target user. That is, the user's voice is collected through the microphone, and the collected voice is analysed to obtain the viewing position of the target user in the current state. Similarly, the number of microphones is not limited here.

For another example, radar or laser positioning may also be used to obtain the viewing position of the target user in the current state. Similarly, the number of radars or lasers is not limited here.

Based on this, in embodiments of the present application, various devices such as cameras, microphones, radars, and lasers may be used to locate the viewing position of the target user in the current state in real time. The specific positioning device used is not limited here, and one device or a combination of multiple devices provided above may be used to achieve the positioning purpose.

For example, positioning devices such as cameras, microphones, radars, and lasers in this embodiment may be integrated into electronic device, or may also be used as external devices. There are no restrictions here, as long as the current position of the target user may be obtained.

Based on the above method of positioning the position of the target user, the method of determining the target user may also be extended to the following methods:

For example, when using camera positioning, face information may be recognized. Determine the user's identity based on the face information, and then use the user with permission as the target user, or the user who often uses the electronic device as the target user, or select the target user based on age, etc. It may also identify the user's posture and select a user who meets the requirements among various postures such as sitting posture, standing posture, etc. as the target user.

For another example, when using microphone positioning, the user who is speaking may be used as the target user. Furthermore, timbre recognition may also be performed based on the collected sounds to determine the user's identity, and the target user may be selected based on the user's identity in the above manner.

For another example, when laser or radar positioning is used, the position changes of multiple users may be positioned, and the user whose position basically remains unchanged is used as the target user.

In this embodiment, by determining the target user, the target user may be selected when there are multiple users, and a line-of-sight angle of the target user for each display area on the display screen is calculated to adjust the display performance of the display screen, so that the display performance of the display screen meets the viewing needs of the target user.

102: Determining a line-of-sight angle of the target user for each display area on a display screen according to the first position.

The first position represents spatial position coordinates of the target user obtained from the perspective of the display screen. After the first position is obtained, a distance between the target user and the display screen may be determined. Each display area on the display screen is identified by coordinates, and its position is known. The line-of-sight angle between each display area and the target user may be obtained based on the distance between the target user and the display screen and the position of each display area.

For the display area of the display screen, because the display area of the display screen is fixed, and the target user views a certain position on the display screen, there may be visual differences in the remaining positions for the target user. Therefore, in this embodiment, the display area of the display screen is divided into multiple display areas. The area of each display area is based on the smallest size that may be recognized by the human eye. That is, the display area is divided by screen pixels, and one display area is one screen pixel. In order to reduce the amount of calculation, multiple screen pixels may also be regarded as one display area, and the specific division may be determined according to actual needs.

103: Determining an adjustment parameter of each line-of-sight angle.

The adjustment parameter refers to a pixel data, including: a RGB value, a brightness value, a white balance, etc. The adjustment parameter may include one or more values in the pixel data. For example, the adjustment parameter may only refer to an adjustment RGB value, or only an adjustment brightness value, or it may include adjusting both the RGB value and the brightness value at the same time, and the specific implementation may be determined according to actual needs and is not limited here.

Therefore, different viewing angles have different adjustment parameters.

104: Adjusting image pixels of an image to be displayed in the display area corresponding to each line-of-sight angle according to the adjustment parameter.

After the adjustment parameter for each viewing angle is obtained, the image pixels of the image to be displayed in the corresponding display area are adjusted according to each adjustment parameter. For example, if there are four image pixels in the image to be displayed in a certain display area, the adjustment parameter of the display area is used to adjust the pixel data of the four image pixels, thereby adjusting the display performance of the display area.

For example, after determining the adjustment parameter of each display area, regardless of whether the image to be displayed changes, the original adjustment parameter may be used to adjust the image pixels in each display area. That is, on the basis that the adjustment parameter of the display area remains unchanged, each time different images are displayed, the adjustment parameter is used to adjust the image pixels of different images.

When the position of the target user remains unchanged, the adjustment parameter of each display area remains unchanged. When the position of the target user changes, the adjustment parameter of each display area needs to be re-determined, and the changed image pixels in the corresponding display area are adjusted based on the re-determined adjustment parameter.

By individually adjusting the image pixels of the image to be displayed in each display area, when the image to be displayed is displayed in each display area, the display performance of the image pixels adjusted by the adjustment parameter is enhanced to varying degrees according to the viewing angle. In this way, a viewing performance of the target user for each display area is consistent, and the defect in the prior art that a viewing performance of the user for some display areas is poor is avoided, thereby improving the viewing performance of the user. Furthermore, ensuring a visual consistency of each display area on the display screen may also improve an overall picture quality of the display screen and enhance a viewing experience of the user.

During specific implementation, the present application is not limited by the execution order of each described step. Certain steps may be performed in other orders or simultaneously without conflict.

Through the method of adjusting the viewing angle of the display screen in the embodiment of the present application, when at least one user is watching the display screen, select the target user based on actual needs and position the target user. Then, the line-of-sight angle of the target user for each display area on the display screen is calculated based on the current position of the target user. After obtaining the line-of-sight angle, the adjustment parameter of each display area is obtained. Based on the adjustment parameter, the image pixels of the image to be displayed in each display area may be adjusted, thereby improving the display performance of the display screen. When the position of the target user remains unchanged, the image pixels displayed in each display area may be continuously adjusted according to the adjustment parameter, thereby saving processing volume and improving adjustment efficiency. Furthermore, when the position of the target user changes, the line-of-sight angle of target user for each display area may also be re-determined, and the adjustment parameter of each display area may be obtained. The image pixels displayed in each display area are adjusted according to the redetermined adjustment parameter, so that the display screen may adaptively adjust the display performance according to the position of the target user, thereby improving the viewing performance of the user in different positions. In addition, in terms of an overall display performance, the defect of inconsistent display effects in the prior art may also be avoided, thereby ensuring an overall picture quality of the display screen and improving a viewing experience of the user.

Based on the method described in the previous embodiment, examples may be given below for further detailed explanation.

In some embodiments, determining the target user, and positioning the first position of the target user comprises:
when at least one user is detected, obtaining a viewing angle adjustment mode of the display screen; and
determining the target user from the at least one user according to the viewing angle adjustment mode, and positioning the first position of the target user.

The embodiment of the present application further provides a method for selecting the target user.

In this embodiment, a qualified target user may be selected from multiple users by selecting the viewing angle adjustment mode. When there is only one user, this user may be directly regarded as the target user.

The viewing angle adjustment mode is compatible with the camera positioning, sound field positioning, laser positioning, radar positioning and other methods mentioned in the above embodiments. After one of the viewing angle adjustment modes, that is, a positioning method, is selected, conditions of the target user corresponding to the viewing angle adjustment mode may be directly determined to select the target user from multiple users.

For example, when the viewing angle adjustment mode is to select a speaking user through sound field positioning, the microphone may be called to collect the position of the sound source, and then the position of the sound source is regarded as the position of the target user.

For another example, when the viewing angle adjustment mode is to use the camera to capture the user closest to the display screen, the camera may be called to capture images. Then the user closest to the display screen is determined from the image. Consider this user as the target user, or it may also perform user identification on the image to determine user permissions. The specific method is the same as the above embodiment and may not be described again here.

Therefore, in this embodiment, the viewing angle adjustment mode is first selected, and then the target user is selected from multiple users according to conditions for determining the target user set in the viewing angle adjustment mode. This method is conducive to flexible conversion of the viewing angle adjustment method of the display screen in different scenarios to adapt to the needs of different users in different scenarios, achieving the performance of conveniently and quickly adjusting the viewing angle of the display screen.

In some embodiments, determining the line-of-sight angle of the target user for each display area on the display screen according to the first position comprises:
determining that the first position is mapped to a second position on the display screen; and
calculating the line-of-sight angle of the target user for each display area on the display screen according to the first position and the second position.

The embodiment of the present application further provides a first calculation method for the line-of-sight angle of the target user for each display area.

Figure 2:
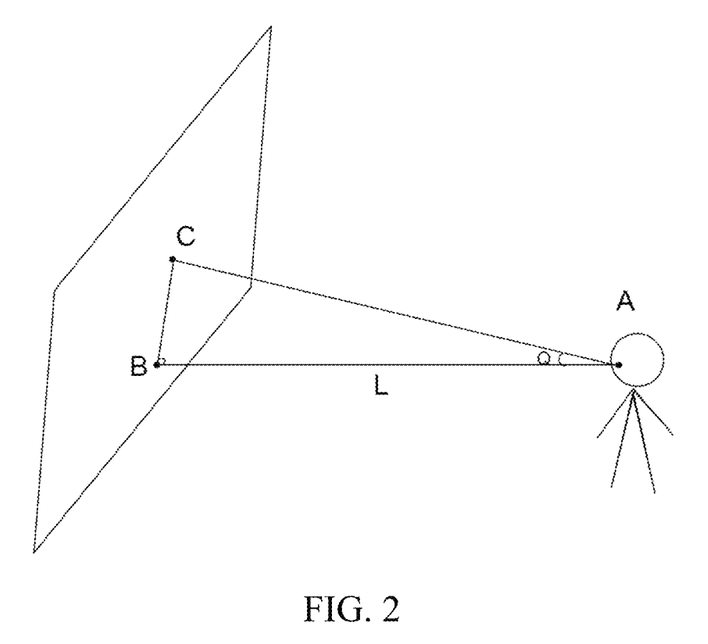
FIG. 2 is a schematic diagram of calculating a line-of-sight angle of a target user to a display area according to an embodiment of the present application.

Referring to FIG. 2, FIG. 2 is a schematic diagram of calculating a line-of-sight angle of a target user to a display area according to an embodiment of the present application. The first position of the target user is recorded as point A, and the first position mapped to the second position on the display screen is recorded as point B. A certain display area on the display screen is marked as point C, and a distance L between point A and point B (that is, the distance between the display screen and the target user) is known. A distance M between point C and point B may be calculated based on coordinate positions of point C and point B. Therefore, an angle value of $\angle Q$ may be obtained according to a tangent function calculation formula, which is the line-of-sight angle between point A of the target user and point C of the display area.

In the same way, when calculating the line-of-sight angle between any display area and the target user, it may be calculated based on a distance L between the target user and the display screen, and a projection point B of the target user on the display screen. After a distance F between any display area and point B is obtained, the line-of-sight angle between any display area and point A of the target user may be calculated based on L and F.

In some embodiments, determining the line-of-sight angle of the target user for each display area on the display screen according to the first position comprises:
obtaining a historical data;
matching a target data from the historical data according to the first position; and
determining the line-of-sight angle of the target user for each display area on the display screen according to the target data.

The embodiment of the present application further provides a second calculation method for the line-of-sight angle of the target user for each display area.

In this embodiment, the user's spatial position coordinates obtained each time and the line-of-sight angle calculated based on the user's spatial position coordinates may be stored as historical data. When it is necessary to determine the line-of-sight angle of the target user for each display area based on the first position of the target user, the historical data may be called first. Then, data with consistent spatial position coordinates is matched from the historical data based on the first position. When there are the same spatial position coordinates as the first position, the line-of-sight angle corresponding to the spatial position coordinates is used as the target data.

When the target data may be matched, the target data may be directly called, and the line-of-sight angle corresponding to each display area of the target user may be analysed from the target data. When obtaining the line-of-sight angle of each display area based on the line-of-sight angle in the target data, the coordinates of the display area corresponding to each line-of-sight angle in the target data may be used, then, the line-of-sight angle is set for each display area through coordinate matching.

When the target data may not be matched, the first calculation method mentioned in the above embodiment may be used to calculate the line-of-sight angle between the target user and each display area one by one.

In this embodiment, target data is matched by obtaining historical data in advance. When the matching is successful, the need to calculate the line-of-sight angles between the display area and the target user one by one may be avoided, thereby reducing the amount of calculation and improving the efficiency of adjusting the viewing angle of the display screen.

In some embodiments, determining the line-of-sight angle of the target user for each display area on the display screen according to the first position comprises:
  determining that the first position is mapped to a second position on the display screen;
  using the second position as an axis, dividing the display area of the display screen into a first symmetrical part, a second symmetrical part, and an asymmetrical part, wherein the first symmetrical part and the second symmetrical part are symmetrically distributed according to the axis;
  calculating the line-of-sight angle of the target user for each display area in the first symmetrical part according to the first position and the second position;
  determining the line-of-sight angle of each display area in the second symmetrical part according to the line-of-sight angle of each display area in the first symmetrical part; and
  calculating the line-of-sight angle of the target user for each display area in the asymmetrical part according to the first position and the second position.

The embodiment of the present application further provides a third calculation method for the line-of-sight angle of the target user for each display area.

Figure 3:
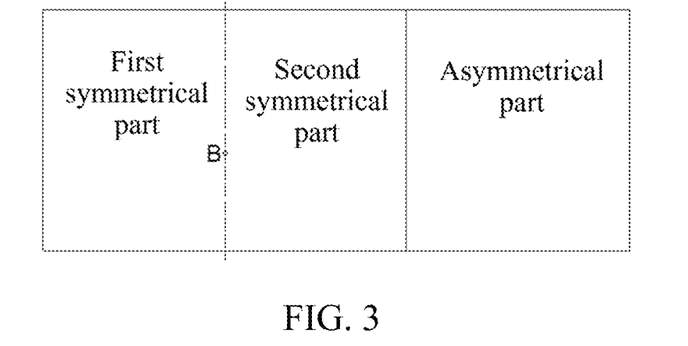
FIG. 3 is a schematic diagram of dividing a display screen using a second position as an axis according to an embodiment of the present application.

Referring to FIG. 3, FIG. 3 is a schematic diagram of dividing a display screen using a second position as an axis according to an embodiment of the present application. In FIG. 3, point B at the second position is taken as the axis. When divided vertically, two parts in the display area with this axis as the axis of symmetry are called the first symmetrical part and the second symmetrical part respectively, and the part in the display area other than the first symmetrical part and the second symmetrical part called the asymmetrical part.

When calculating the line-of-sight angle of the target user for each display area, only the line-of-sight angle of the target user for each display area in the first symmetrical part and the asymmetrical part may be calculated. As for the second symmetrical part, because the second symmetrical part is symmetrical with the first part, the line-of-sight angle of each display area in the first symmetrical part is directly mirrored to the corresponding display area of the second symmetrical part. The viewing angle of each display area in the second symmetrical part may be obtained.

The positions of the first symmetrical part and the second part are relative. As long as the line-of-sight angle of each display area in any part is calculated, the line-of-sight angle of each display area in another part may be obtained.

This embodiment is based on symmetry to reduce the amount of calculation for any symmetrical part. Therefore, the way of dividing the axis based on the second position may depend on the size of the display screen. When a length of the display screen is greater than a width, the horizontal axis may be set to divide the display area. When the width of the display screen is greater than the length, the vertical axis may be set to divide the display area. Because there are many division methods that are not listed here, it is understandable that any division method that may reduce the amount of calculation may be used in this embodiment.

In addition, it should be noted that this embodiment is divided into symmetrical parts and asymmetrical parts based on symmetry. When the axis is located at the centreline of the display screen, there is no asymmetrical part. Therefore, there is no need to calculate the viewing angle for each display area in the asymmetrical part.

In some embodiments, determining the adjustment parameter of each line-of-sight angle comprises:

matching the adjustment parameter for each viewing angle from multiple preset adjustment parameters.

The embodiments of the present application further provide a way to determine the adjustment parameter.

For example, the corresponding relationship between the line-of-sight angle and the adjustment parameter may be set in advance. After obtaining the line-of-sight angle of each display area, the adjustment parameter corresponding to the line-of-sight angle may be obtained based on the corresponding relationship.

In some embodiments, determining the adjustment parameter of each line-of-sight angle comprises:
  obtaining a preset angle and a preset parameter;
  calculating a difference value between each line-of-sight angle and the preset angle; and
  determining the adjustment parameter for each line-of-sight angle according to the preset parameter and the difference value.

The embodiments of the present application further provide another way to determine the adjustment parameter.

A preset angle may be set and the preset parameter of the preset angle may be determined. When calculating the adjustment parameter for each line-of-sight angle, the difference between each line-of-sight angle and the preset angle may be obtained first. Based on the sum of the difference and the preset parameter one by one, the adjustment parameter for each line-of-sight angle is obtained.

It is considered that there is a delay in some electronic devices when adjusting the viewing angle of the display screen using the method provided by the embodiment of the present application. Therefore, the line-of-sight angle of the target user for each display area is not calculated in real time, but only the line-of-sight angle of the target user for each display area is stored. When needed, just call it directly from the storage position. This method avoids repeated calculation of the line-of-sight angle and saves calculations.

In addition, in order to reuse the visual angle of each display area, saving the visual angle of each display area may avoid data loss. This avoids the need to calculate the viewing angle all the time. Because the operating speed of electronic devices is greatly limited by storage space, the display area on the display screen may be divided into thousands. Storing the viewing angles of all display areas may occupy an excessively large amount of storage space, thereby obstructing the operating space of the electronic device, resulting in slow operation of the electronic device.

Therefore, in order to save storage space and improve the operating speed of electronic device, the solution of this application also proposes a method of improving the operating performance of electronic device by reducing the storage amount at the viewing angle. In the following embodiments, two embodiments are provided for description. It may be understood that the solutions described in the following two embodiments may directly or indirectly borrow the solutions provided in the first embodiment, and therefore, repeated solutions may not be described in detail.

Figure 4:
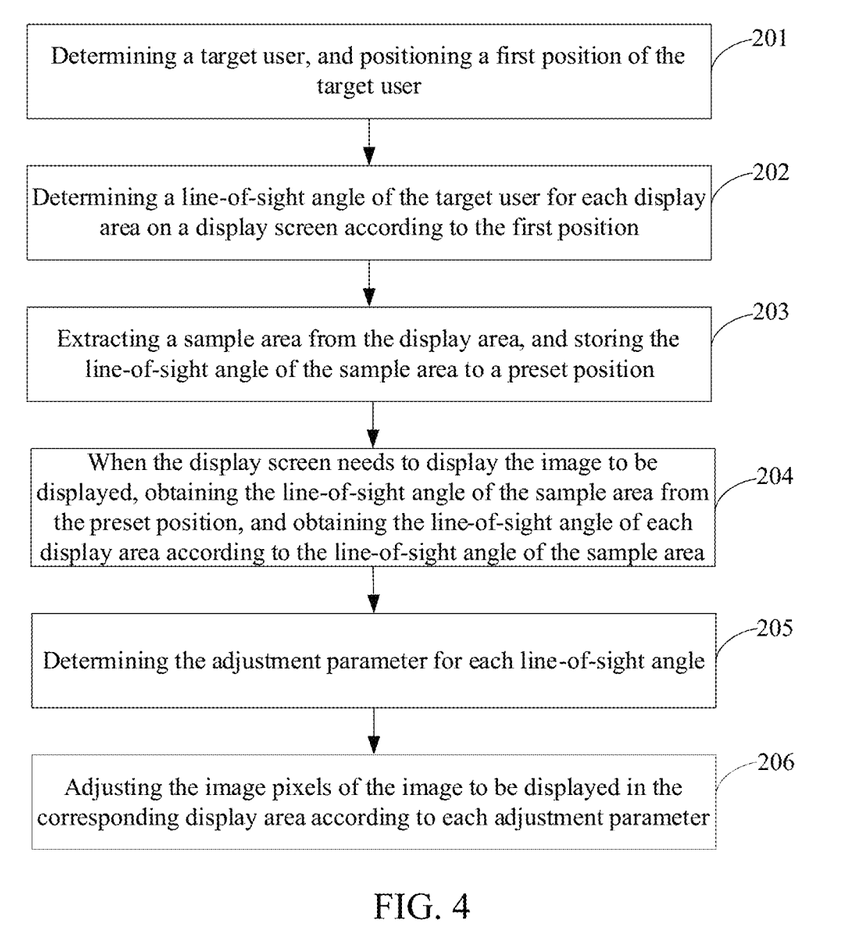
FIG. 4 is a second schematic flowchart of a method for adjusting a viewing angle of a display screen according to an embodiment of the present application.

Referring to FIG. 4, FIG. 4 is a second schematic flowchart of a method for adjusting a viewing angle of a display screen according to an embodiment of the present application. The specific process may be as follows:

201: Determining a target user, and positioning a first position of the target user.
  202: Determining a line-of-sight angle of the target user for each display area on a display screen according to the first position.

203: Extracting a sample area from the display area, and storing the line-of-sight angle of the sample area to a preset position.

The default position may be storage, a specified folder, or a cloud server. Because the storage position may be selected by those skilled in the art according to actual needs, details may not be described here.

After the sample area is extracted, the sample area is identified according to its coordinates, and the number of sample areas extracted from the line-of-sight depends on the specific situation. After extracting the sample area to obtain the line-of-sight angle, the data of the line-of-sight angle of the sample area may also be compressed, and then decompressed when needed.

By storing the line-of-sight angle of the sample area to a preset position, it may be ensured that the line-of-sight angle of the sample area is not easily lost. May be called from a preset position whenever the viewing angle of the sample area is required. This avoids the need to recalculate the line-of-sight angle every time and enables the reuse of the calculated the line-of-sight angle.

Furthermore, by sampling the display area to obtain a sample area and storing the line-of-sight angle of the sample area, the storage space occupied by the electronic device may be greatly reduced. This may provide sufficient operating space for electronic devices to increase their operating speed, achieve faster image pixel processing, and thereby increase the display speed of the display screen.

204: When the display screen needs to display the image to be displayed, obtaining the line-of-sight angle of the sample area from the preset position, and obtaining the line-of-sight angle of each display area according to the line-of-sight angle of the sample area.

When an electronic device detects a video stream, it indicates that an image needs to be displayed through the display. Before displaying the image, the line-of-sight angle of the sample area is first obtained from the preset position, and the line-of-sight angle of each display area is restored one by one according to the line-of-sight angle of the sample area.

205: Determining the adjustment parameter for each line-of-sight angle.

206: Adjusting the image pixels of the image to be displayed in the corresponding display area according to each adjustment parameter.

Whenever the viewing angle of a display area is restored, the adjustment parameter of the display area may be determined. By adjusting parameter, the image pixels of the image to be displayed in the display area are adjusted in real time, thereby realizing dynamic adjustment of each image pixel. This avoids the need to restore all viewing angles. The delay that exists when the image pixels of each display area are adjusted uniformly, thereby greatly improving the processing speed of image pixels by the electronic device and ensuring the smoothness of image display.

In some embodiments, extracting the sample area from the line-of-sight angle, and storing the line-of-sight angle of the sample area to the preset position comprises:

extracting the sample area from the display area at a preset sampling rate according to a preset direction, and storing the line-of-sight angle of the sample area to the preset position.

The embodiment of the present application further provides a method of extracting a sample area.

Figure 5:
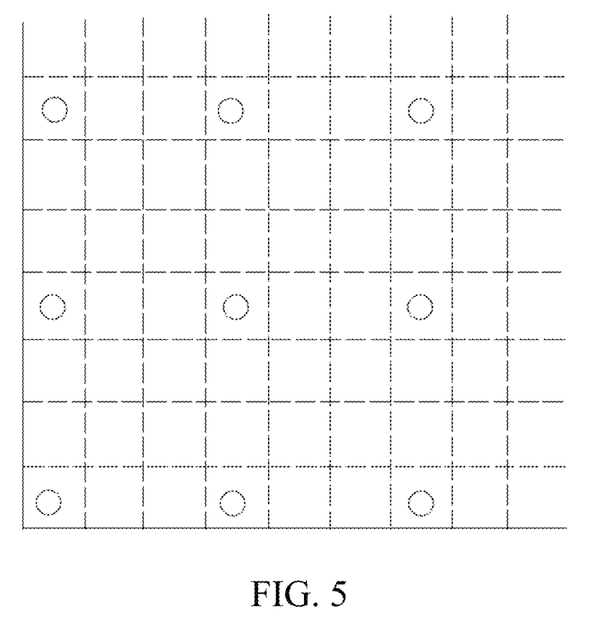
FIG. 5 is a schematic diagram of a sample extraction area according to an embodiment of the present application.

Referring to FIG. 5, FIG. 5 is a schematic diagram of a sample extraction area according to an embodiment of the present application. In FIG. 5, sampling may be performed from the horizontal axis direction and the vertical axis direction respectively, and the preset sampling rate may be set to 3. Each grid represents a display area, and the extracted sample area is marked with a circle, and the area not marked with a circle is a non-sample area.

It should be noted that because the display screen divides the display area according to pixel points, the display area may be divided into many parts. Therefore, FIG. 5 is limited to a partial schematic description of the display screen, and the preset sampling rate of 3 is only used to explain FIG. 5. During actual sampling, the preset sampling rate may be set according to the display size.

It may be understood that by setting the preset direction and the preset sampling rate, different sampling results may be obtained. Therefore, the preset direction and the preset sampling rate may be set according to actual needs, and this is not regarded as a limitation on the embodiments of the present application.

In some embodiments, obtaining the line-of-sight angle of the sample area from the preset position, and obtaining the line-of-sight angle of each display area according to the line-of-sight angle of the sample area comprises:

obtaining the line-of-sight angle of the sample area from the preset position;

taking any one of two adjacent sample areas as a reference area; and calculating the line-of-sight angle of a non-sample area between the two adjacent sample areas according to the line-of-sight angle of the reference area, and obtaining the line-of-sight angle of each display area, wherein a display area other than the sample area is the non-sample area.

Embodiments of the present application further provide a method of restoring the line-of-sight angle of each display area according to the line-of-sight angle of the sample area.

The line-of-sight angles of two adjacent sample areas are on the same axis, that is, their abscissas are the same or their ordinates are the same. Therefore, when calculating the line-of-sight angle of the non-sample area, only the value of the abscissa or ordinate may be considered.

For example, when any one of two adjacent sample areas is used as the reference area, because the preset sampling rate is known, the number of non-sample areas between the two sample areas may be known. Then, the position coordinates of each non-sample area are obtained based on the position coordinates of the two sample areas. After the position coordinates of each non-sample area are obtained and the line-of-sight angle of the reference area is known, the line-of-sight angle of each non-sample area may be directly calculated.

Figure 6:
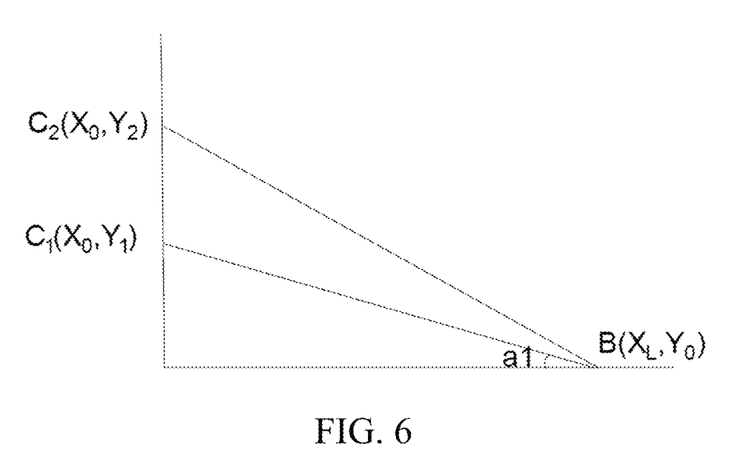
FIG. 6 is a schematic diagram of obtaining a line-of-sight angle of a non-sample area based on a line-of-sight angle of a reference area according to an embodiment of the present application.

Referring to FIG. 6, FIG. 6 is a schematic diagram of obtaining a line-of-sight angle of a non-sample area based on a reference area according to an embodiment of the present application. In FIG. 6, position coordinates of the reference area are represented by C1 (X0, Y1), the line-of-sight angle is represented by a1, and the position coordinates of a non-sample area are represented by C2 (X0, Y2). The position coordinate C1 of the sample area is known. When the position coordinates of another sample area adjacent to the reference area are C4 (X0, Y4), and the preset sampling rate is 3, the position coordinates C2 of the first non-sample area in the non-sample area may be calculated (X0, Y2).

For example, according to C1 and a1, the first position point A of the target user may be obtained, which may be expressed as A (XL, Y0). According to the first position point A and C2 (X0, Y2), the line-of-sight angle between the first position point A and the position coordinate point C2 of the first non-sample area may be obtained.

The slope may also be used to represent the line-of-sight angle of the non-sample area. The calculation formula for expressing the position point in FIG. 6 as the slope may be as follows:

$$K = (Y_2 - Y_0)/(X_0 - X_L).$$

Based on this, the line-of-sight angle of the non-sample area between the two adjacent sample areas may be obtained through the line-of-sight angles of each two adjacent sample areas, and by analogy, the line-of-sight angles of all display areas may be calculated.

Figure 7:
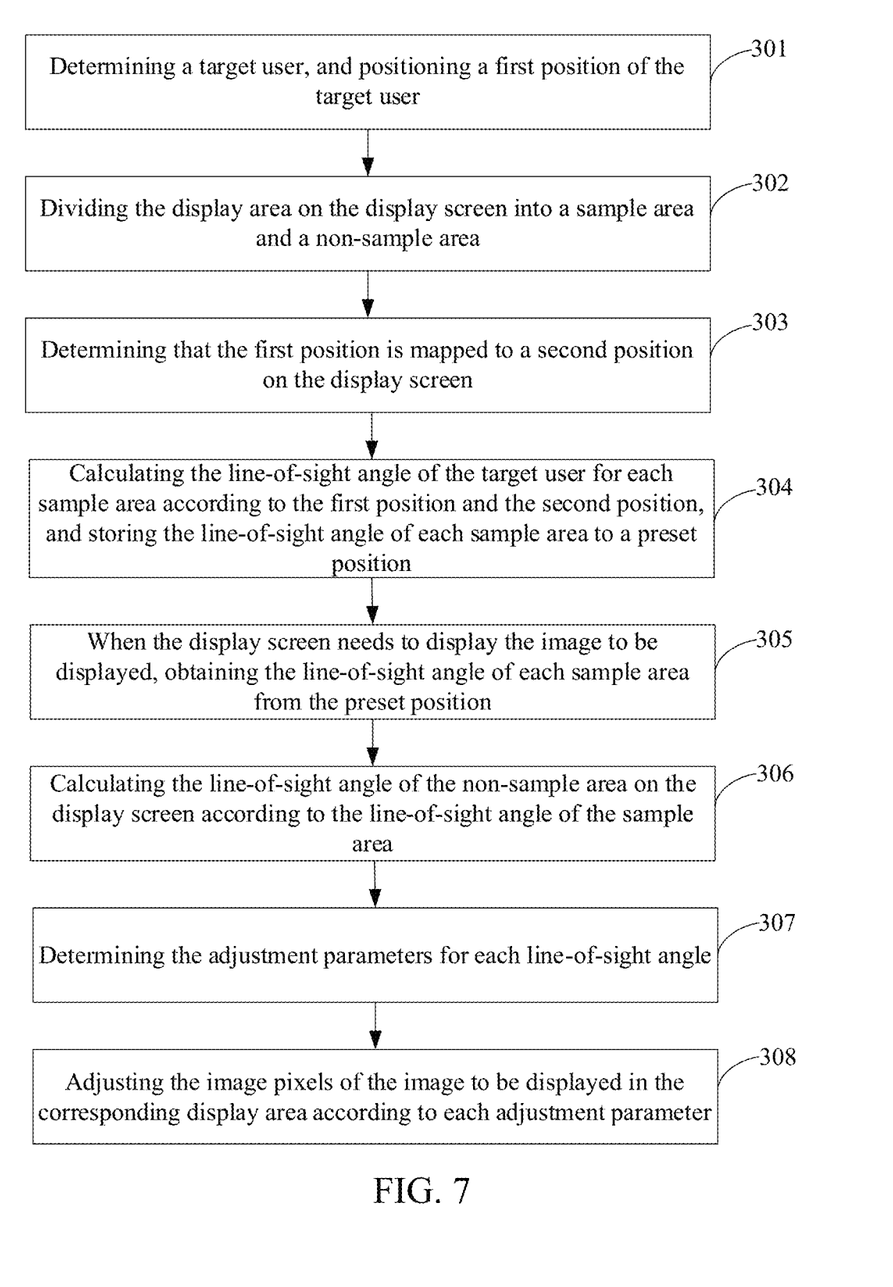
FIG. 7 is a third schematic flowchart of a method for adjusting a viewing angle of a display screen according to an embodiment of the present application.

Referring to FIG. 7, FIG. 7 is a third schematic flowchart of a method for adjusting a viewing angle of a display screen according to an embodiment of the present application. The specific process may be as follows:

301: Determining a target user, and positioning a first position of the target user.
302: Dividing the display area on the display screen into a sample area and a non-sample area.
303: Determining that the first position is mapped to a second position on the display screen.
304: Calculating the line-of-sight angle of the target user for each sample area according to the first position and the second position, and storing the line-of-sight angle of each sample area to a preset position.
305: When the display screen needs to display the image to be displayed, obtaining the line-of-sight angle of each sample area from the preset position.
306: Calculating the line-of-sight angle of the non-sample area on the display screen according to the line-of-sight angle of the sample area.
307: Determining the adjustment parameters for each line-of-sight angle.
308: Adjusting the image pixels of the image to be displayed in the corresponding display area according to each adjustment parameter.

In this embodiment, the sample area may be extracted first, and the sampling method may refer to FIG. 5 provided in the above embodiment. After the sampling is completed, the line-of-sight angle of the target user for each sample area may be directly calculated. There is no need to calculate the line-of-sight angle of each display area before sampling. This reduces the amount of calculation of the line-of-sight angle and improves the processing speed of the electronic device.

In this embodiment, the calculation of the line-of-sight angle, the sampling method and the method of determining the adjustment parameter may refer to the contents mentioned in the above embodiment, and may not be described again here.

In some embodiments, the sample area is extracted from the display area on the display screen, and the display area includes a sample area and a non-sample area, including:

extracting a sample area from the display area at a preset sampling rate based on a preset direction, where the display area includes a sample area and a non-sample area.

Referring to FIG. 5 mentioned in the above embodiment, sampling may be performed from the horizontal axis direction and the vertical axis direction respectively, and the preset sampling rate may be set according to actual needs. The area marked with a circle after sampling is the sample area, and the rest is the non-sample area.

After each sample area is obtained, the method of calculating the line-of-sight angle of the target user for each display area provided in the above embodiment may be used to calculate the line-of-sight angle of target user for each sample area, and then store the calculated line-of-sight angle in a preset position.

In some embodiments, the line-of-sight angle of the non-sample area on the display screen is calculated based on the line-of-sight angle of the sample area, including:

taking any one of two adjacent sample areas as a reference area; and
calculating the line-of-sight angle of a non-sample area between the two adjacent sample areas according to the line-of-sight angle of the reference area, and obtaining the line-of-sight angle of each display area.

As for the method of restoring the line-of-sight angle of the remaining display areas according to the line-of-sight angle of the sample area, reference may be made to the solution provided by the above-mentioned second embodiment, which may not be described again here.

The sampling plan in the above-mentioned second embodiment and third embodiment may also be based on calculating the line-of-sight angle and then determining the adjustment parameter corresponding to the line-of-sight angle. After sampling, the stored data includes position coordinates, the line-of-sight angle, and the adjustment parameter. In this way, when the line-of-sight angle of each display area is restored, the adjustment parameter of each display area may be restored. Therefore, the image pixels of the image to be displayed in the corresponding display area may be adjusted directly according to the adjustment parameter.

It may be seen from the above that the method for adjusting the viewing angle of the display screen proposed by the embodiment of the present application may dynamically adjust the image pixels of the display area according to the adjustment parameter corresponding to each display area. This makes the display performance of image pixels displayed in each display area consistent. From a user perspective, it improves the user viewing performance. Based on the perspective of the display screen, the display performance of the display screen is improved. The different display areas may be adjusted separately, which improves flexibility of display adjustment. Furthermore, storing data through sampling may also avoid the delay in displaying images on the display screen and improve the image display rate.

Figure 8:
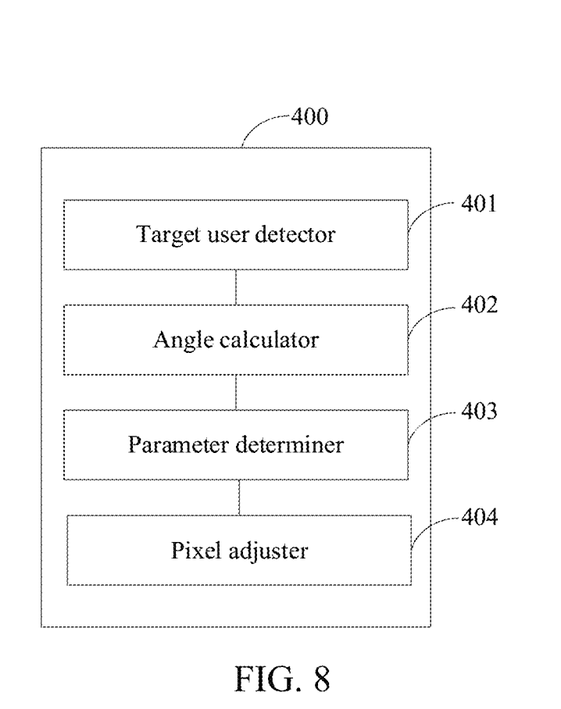
FIG. 8 is a schematic structural diagram of an apparatus for adjusting a viewing angle of a display screen according to an embodiment of the present application.

In one embodiment, an apparatus 400 for adjusting a viewing angle of a display screen is also provided. Referring to FIG. 8, FIG. 8 is a schematic structural diagram of an apparatus 400 for adjusting a viewing angle of a display screen according to an embodiment of the present application. The apparatus 400 for adjusting the viewing angle of the display screen is applied to an electronic device. The apparatus 400 for adjusting the viewing angle of the display screen includes a target user detector 401, an angle calculator 402, a parameter determiner 403, and a pixel adjuster 404, as follows:

The target user detector 401 is configured to determine a target user and position a first position of the target user.

The angle calculator 402 is configured to determine a line-of-sight angle of the target user for each display area on a display screen according to the first position.

The parameter determiner 403 is configured to determine an adjustment parameter of each line-of-sight angle.

The pixel adjuster 404 is configured to adjust image pixels of an image to be displayed in the display area corresponding to each line-of-sight angle according to the adjustment parameter.

In some embodiments, the target user detector 401 is further configured to:
when at least one user is detected, obtain a viewing angle adjustment mode of the display screen; and
determine the target user from the at least one user according to the viewing angle adjustment mode and position the first position of the target user.

In some embodiments, the angle calculator 402 is further configured to:
determine that the first position is mapped to a second position on the display screen; and
calculate the line-of-sight angle of the target user for each display area on the display screen according to the first position and the second position.

In some embodiments, the angle calculator 402 is further configured to:
obtain a historical data;
match a target data from the historical data according to the first position; and
determine the line-of-sight angle of the target user for each display area on the display screen according to the target data.

In some embodiments, the angle calculator 402 is further configured to:
determine that the first position is mapped to a second position on the display screen;
use the second position as an axis, divide the display area of the display screen into a first symmetrical part, a second symmetrical part, and an asymmetrical part, wherein the first symmetrical part and the second symmetrical part are symmetrically distributed according to the axis;
calculate the line-of-sight angle of the target user for each display area in the first symmetrical part according to the first position and the second position;
determine the line-of-sight angle of each display area in the second symmetrical part according to the line-of-sight angle of each display area in the first symmetrical part; and
calculate the line-of-sight angle of the target user for each display area in the asymmetrical part according to the first position and the second position.

This embodiment further provides another apparatus for adjusting a viewing angle of a display screen. Based on the apparatus 400 in FIG. 8, the apparatus for adjusting the viewing angle of the display screen in this embodiment further includes a memory.

The angle calculator 402 is further configured to:
extract a sample area from the display area, and store the line-of-sight angle of the sample area to a preset position;
when the display screen needs to display the image to be displayed, obtain the line-of-sight angle of the sample area from the preset position, and obtain the line-of-sight angle of each display area according to the line-of-sight angle of the sample area;

The parameter determiner 403 is further configured to:
determine the adjustment parameter for each line-of-sight angle.

The pixel adjuster 404 is further configured to:
adjust the image pixels of the image to be displayed in the corresponding display area according to each adjustment parameter.

In some embodiments, the angle calculator 402 is further configured to:
extracting a sample area from the display area at a preset sampling rate according to a preset direction, and storing a line-of-sight angle of the sample area to the memory.

When the display screen needs to display an image to be displayed, the angle calculator 402 is further configured to:
obtain the line-of-sight angle of the sample area from the preset position;
take any one of the line-of-sight angles of two adjacent sample areas as a reference area;
calculate the line-of-sight angle of the non-sample area between two adjacent sample areas according to the line-of-sight angle of the reference area, and obtain the line-of-sight angle of each display area.

This embodiment further provides another apparatus 400 for adjusting a viewing angle of a display screen. The structure is the same as that provided in the above embodiment. In this embodiment, the angle calculator 402 is further configured to:
extract a sample area from the display area on the display screen, and the display area includes a sample area and a non-sample area;
determine that the first position is mapped to a second position on the display screen;
calculate a line-of-sight angle of the target user for each sample area according to the first position and the second position, and store the line-of-sight angle of each sample area to a preset position;
when the display screen needs to display the image to be displayed, obtain the line-of-sight angle of each sample area from the preset position;
calculate the line-of-sight angle of the non-sample area on the display screen according to the line-of-sight angle of the sample area;

The parameter determiner 403 is further configured to:
determine the adjustment parameter for each line-of-sight angle.

The pixel adjuster 404 is further configured to:
adjust the image pixels of the image to be displayed in the corresponding display area according to each adjustment parameter.

It should be noted that the apparatus for adjusting the viewing angle of the display screen provided in the embodiment of the present application and the method for adjusting the viewing angle of the display screen in the above embodiments belong to the same concept. Any of the methods provided in the method embodiments for adjusting the viewing angle of the display screen may be implemented through the apparatus for adjusting the viewing angle of the display screen. The specific implementation process may be found in the embodiment of the method for adjusting the viewing angle of the display screen, and may not be described again here.

It should be noted that the apparatus for adjusting the viewing angle of the display screen provided in the embodiment of the present application and the method for adjusting the viewing angle of the display screen in the above embodiments belong to the same concept. Any of the methods provided in the method embodiments for adjusting the viewing angle of a display screen may be implemented through the apparatus for adjusting the viewing angle of the display screen. The specific implementation process may be found in the embodiment of the method for adjusting the viewing angle of the display screen, and may not be described again here.

Figure 9:
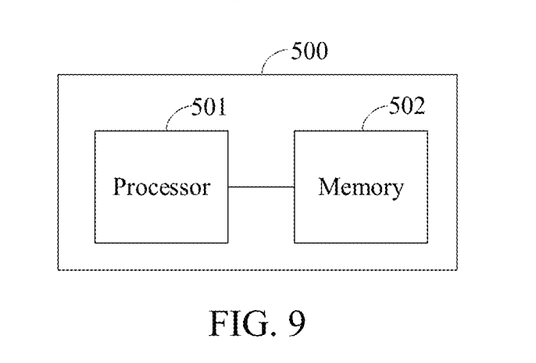
FIG. 9 is a schematic structural diagram of an electronic device according to an embodiment of the present application.

An embodiment of the present application also provides an electronic device. The electronic device may be a television, a movie machine, a conference machine, a projector, a tablet, a computer or other device with a display. The display screen on the electronic device may be a VA screen. As shown in FIG. 9, FIG. 9 is a schematic structural diagram of an electronic device according to an embodiment of the present application. The electronic device 500 includes a processor 501 with one or more processing cores, a memory 502 with one or more computer-readable storage media, and a computer program stored on the memory 502 and executable on the processor. The processor 501 is electrically connected to the memory 502. Those skilled in the art may understand that the structure of the electronic device shown in the figures does not constitute a limitation of the electronic device, and may include more or fewer components than shown in the figures, or combine certain components, or arrange different components.

The processor 501 is a control centre of the electronic device 500, uses various interfaces and lines to connect various parts of the entire electronic device 500, operates by running or loading software programs and/or modules stored in memory 502, and calls the data stored in the memory 502 to perform various functions of the electronic device 500 and process data, thereby monitoring the electronic device 500 as a whole.

In this embodiment of the present application, the processor 501 in the electronic device 500 follows the following steps. Instructions corresponding to the processes of one or more application programs are loaded into the memory 502, and the processor 501 runs the application programs stored in the memory 502 to implement various functions:

determining a target user, and positioning a first position of the target user;

determining a line-of-sight angle of the target user for each display area on a display screen according to the first position;

determining an adjustment parameter of each line-of-sight angle; and adjusting image pixels of an image to be displayed in the display area corresponding to each line-of-sight angle according to the adjustment parameter.

For the specific implementation of each of the above operations, refer to the previous embodiments and may not be described again here.

In the above embodiments, each embodiment is described with its own emphasis. For parts that are not described in detail in a certain embodiment, please refer to the relevant descriptions of other embodiments.

It may be seen from the above that the electronic device provided by this embodiment may dynamically adjust the image pixels of the display area according to the adjustment parameters corresponding to each display area. This makes the display performance of image pixels displayed in each display area consistent. From a user perspective, it improves the user viewing performance. Based on the perspective of the display screen, the display performance of the display screen is improved. Different display areas may be adjusted separately, which improves flexibility of display adjustment. Furthermore, storing data through sampling may also avoid the delay in displaying images on the display screen and improve the image display rate.

Those of ordinary skill in the art may understand that, all or part of the steps in the various methods of the above embodiments may be completed through instructions, or through instructions to control related hardware. The instructions may be stored in a computer-readable storage medium and loaded and executed by the processor.

To this end, embodiments of the present application provide a computer-readable storage medium. Those of ordinary skill in the art may understand that all or part of the steps in implementing the methods of the above embodiments may be completed by instructing relevant hardware through programs. The program may be stored in a computer-readable storage medium. When executed, the program includes the following steps:

determining a target user, and positioning a first position of the target user;

determining a line-of-sight angle of the target user for each display area on a display screen according to the first position;

determining an adjustment parameter of each line-of-sight angle; and adjusting image pixels of an image to be displayed in the display area corresponding to each line-of-sight angle according to the adjustment parameter.

For the specific implementation of each of the above operations, refer to the previous embodiments and may not be described again here.

The above-mentioned storage media may be ROM/RAM, magnetic disk, optical disk, etc. Due to the computer program stored in the storage medium, the steps in any method for adjusting the viewing angle of a display screen provided in the embodiments of the present application may be performed. Therefore, beneficial effects achieved by any of the methods for adjusting the viewing angle of the display screen provided in the embodiments of the present application may be achieved. For details, refer to the previous embodiments and may not be described again here.

The above describes in detail the method, device, medium and electronic device for adjusting the viewing angle of a display screen provided by the embodiments of the present application. This article uses specific examples to illustrate the principles and implementation methods of this application. The description of the above embodiments is only used to help understand the method and its core idea of this application. In addition, for those skilled in the art, there may be changes in the specific implementation and application scope based on the ideas of this application. In summary, the contents of this specification should not be construed as limiting this application.

What is claimed is:

1. A method for adjusting a viewing angle of a display screen, comprising:

determining a target user, and positioning a first position of the target user;

determining a line-of-sight angle of the target user for each display area on a display screen according to the first position;

determining an adjustment parameter of each line-of-sight angle;

adjusting image pixels of an image to be displayed in the display area corresponding to each line-of-sight angle according to the adjustment parameter; and wherein determining the adjustment parameter of each line-of-sight angle comprises:

obtaining a preset angle and a preset parameter;

calculating a difference value between each line-of-sight angle and the preset angle; and determining the adjustment parameter for each line-of-sight angle according to the preset parameter and the difference value.

2. The method according to claim 1, wherein determining the target user, and positioning the first position of the target user comprises:
  when at least one user is detected, obtaining a viewing angle adjustment mode of the display screen; and
  determining the target user from the at least one user according to the viewing angle adjustment mode, and positioning the first position of the target user.

3. The method according to claim 1, wherein determining the line-of-sight angle of the target user for each display area on the display screen according to the first position comprises:
  determining that the first position is mapped to a second position on the display screen; and
  calculating the line-of-sight angle of the target user for each display area on the display screen according to the first position and the second position.

4. The method according to claim 1, wherein determining the line-of-sight angle of the target user for each display area on the display screen according to the first position comprises:
  obtaining a historical data;
  matching a target data from the historical data according to the first position; and
  determining the line-of-sight angle of the target user for each display area on the display screen according to the target data.

5. The method according to claim 1, wherein after determining the line-of-sight angle of the target user for each display area on the display screen according to the first position, the method further comprises:
  extracting a sample area from the display area, and storing the line-of-sight angle of the sample area to a preset position;
  when the display screen needs to display the image to be displayed, obtaining the line-of-sight angle of the sample area from the preset position, and obtaining the line-of-sight angle of each display area according to the line-of-sight angle of the sample area;
  determining the adjustment parameter for each line-of-sight angle; and
  adjusting the image pixels of the image to be displayed in the corresponding display area according to each adjustment parameter.

6. The method according to claim 5, wherein extracting the sample area from the line-of-sight angle, and storing the line-of-sight angle of the sample area to the preset position comprises:
  extracting the sample area from the display area at a preset sampling rate according to a preset direction, and storing the line-of-sight angle of the sample area to the preset position.

7. The method according to claim 5, wherein obtaining the line-of-sight angle of the sample area from the preset position, and obtaining the line-of-sight angle of each display area according to the line-of-sight angle of the sample area comprises:
  obtaining the line-of-sight angle of the sample area from the preset position;
  taking any one of two adjacent sample areas as a reference area; and
  calculating the line-of-sight angle of a non-sample area between the two adjacent sample areas according to the line-of-sight angle of the reference area, and obtaining the line-of-sight angle of each display area, wherein a display area other than the sample area is the non-sample area.

8. The method according to claim 1, wherein after determining the target user, and positioning the first position of the target user, the method further comprises:
  dividing the display area on the display screen into a sample area and a non-sample area;
  determining that the first position is mapped to a second position on the display screen;
  calculating the line-of-sight angle of the target user for each sample area according to the first position and the second position, and storing the line-of-sight angle of each sample area to a preset position;
  when the display screen needs to display the image to be displayed, obtaining the line-of-sight angle of each sample area from the preset position;
  calculating the line-of-sight angle of the non-sample area on the display screen according to the line-of-sight angle of the sample area;
  determining the adjustment parameters for each line-of-sight angle; and
  adjusting the image pixels of the image to be displayed in the corresponding display area according to each adjustment parameter.

9. An apparatus for adjusting a viewing angle of a display screen, comprising:
  a target user detector configured to determine a target user and position a first position of the target user;
  an angle calculator configured to determine a line-of-sight angle of the target user for each display area on a display screen according to the first position;
  a parameter determiner configured to determine an adjustment parameter of each line-of-sight angle;
  a pixel adjuster configured to adjust image pixels of an image to be displayed in the display area corresponding to each line-of-sight angle according to the adjustment parameter;
  wherein after determining the line-of-sight angle of the target user for each display area on the display screen according to the first position, the angle calculator is further configured to:
  extract a sample area from the display area, and store the line-of-sight angle of the sample area to a preset position;
  when the display screen needs to display the image to be displayed, obtain the line-of-sight angle of the sample area from the preset position, and obtain the line-of-sight angle of each display area according to the line-of-sight angle of the sample area;
  wherein the parameter determiner is further configured to:
  determine the adjustment parameter for each line-of-sight angle; and
  wherein the pixel adjuster is further configured to:
  adjust the image pixels of the image to be displayed in the corresponding display area according to each adjustment parameter.

10. The apparatus according to claim 9, wherein the target user detector is further configured to:
  when at least one user is detected, obtain a viewing angle adjustment mode of the display screen; and
  determine the target user from the at least one user according to the viewing angle adjustment mode and position the first position of the target user.

11. The apparatus according to claim 9, wherein the angle calculator is further configured to:
  determine that the first position is mapped to a second position on the display screen; and calculate the line-of-sight angle of the target user for each display area on the display screen according to the first position and the second position.

12. The apparatus according to claim 9, wherein the angle calculator is further configured to:
obtain a historical data;
match a target data from the historical data according to the first position; and
determine the line-of-sight angle of the target user for each display area on the display screen according to the target data.

13. The apparatus according to claim 9, wherein the angle calculator is further configured to:
determine that the first position is mapped to a second position on the display screen;
use the second position as an axis, divide the display area of the display screen into a first symmetrical part, a second symmetrical part, and an asymmetrical part, wherein the first symmetrical part and the second symmetrical part are symmetrically distributed according to the axis;
calculate the line-of-sight angle of the target user for each display area in the first symmetrical part according to the first position and the second position;
determine the line-of-sight angle of each display area in the second symmetrical part according to the line-of-sight angle of each display area in the first symmetrical part; and
calculate the line-of-sight angle of the target user for each display area in the asymmetrical part according to the first position and the second position.

14. The apparatus according to claim 9, wherein extracting the sample area from the line-of-sight angle, and storing the line-of-sight angle of the sample area to the preset position comprises: extracting the sample area from the display area at a preset sampling rate according to a preset direction, and storing the line-of-sight angle of the sample area to the preset position.

15. The apparatus according to claim 14, wherein obtaining the line-of-sight angle of the sample area from the preset position, and obtaining the line-of-sight angle of each display area according to the line-of-sight angle of the sample area comprises:
obtaining the line-of-sight angle of the sample area from the preset position;
taking any one of two adjacent sample areas as a reference area; and
calculating the line-of-sight angle of a non-sample area between the two adjacent sample areas according to the line-of-sight angle of the reference area, and obtaining the line-of-sight angle of each display area, wherein a display area other than the sample area is the non-sample area.

16. An electronic device comprising a processor and a memory, wherein the memory stores a computer program, and the processor is configured to perform a method for adjusting a viewing angle of a display screen, comprising:
determining a target user, and positioning a first position of the target user;
determining a line-of-sight angle of the target user for each display area on a display screen according to the first position;
determining an adjustment parameter of each line-of-sight angle;
adjusting image pixels of an image to be displayed in the display area corresponding to each line-of-sight angle according to the adjustment parameter;
wherein determining the line-of-sight angle of the target user for each display area on the display screen according to the first position comprises:
determining that the first position is mapped to a second position on the display screen;
using the second position as an axis, dividing the display area of the display screen into a first symmetrical part, a second symmetrical part, and an asymmetrical part, wherein the first symmetrical part and the second symmetrical part are symmetrically distributed according to the axis;
calculating the line-of-sight angle of the target user for each display area in the first symmetrical part according to the first position and the second position;
determining the line-of-sight angle of each display area in the second symmetrical part according to the line-of-sight angle of each display area in the first symmetrical part; and
calculating the line-of-sight angle of the target user for each display area in the asymmetrical part according to the first position and the second position.

17. The electronic device according to claim 16, wherein the processor is configured to:
when at least one user is detected, obtain a viewing angle adjustment mode of the display screen; and
determine the target user from the at least one user according to the viewing angle adjustment mode, and position the first position of the target user.

* * * * *